US006880488B1

(12) United States Patent
Hall

(10) Patent No.: US 6,880,488 B1
(45) Date of Patent: Apr. 19, 2005

(54) LIVE POULTRY LOADING SYSTEM

(76) Inventor: Robert L. Hall, P.O. Box 80866, Athens, GA (US) 30608-0866

( * ) Notice: Subject to any disclaimer, the term of this patent is extended or adjusted under 35 U.S.C. 154(b) by 0 days.

(21) Appl. No.: 10/405,304

(22) Filed: Apr. 2, 2003

(51) Int. Cl.[7] .......................................... A01K 29/00
(52) U.S. Cl. ................................................... 119/846
(58) Field of Search ........................ 119/846, 843, 842, 119/845, 847, 848

(56) References Cited

U.S. PATENT DOCUMENTS

| 3,722,477 | A |   | 3/1973  | Weldy et al.                  |
|-----------|---|---|---------|-------------------------------|
| 3,785,349 | A |   | 1/1974  | Christopher                   |
| 4,037,565 | A | * | 7/1977  | Ledwell, Jr. ............ 119/846 |
| 4,074,658 | A | * | 2/1978  | Mermelstein et al. .... 119/846 |
| 4,201,156 | A | * | 5/1980  | Kahler .................. 119/846 |
| 4,365,591 | A | * | 12/1982 | Wills et al. ............. 119/845 |
| 4,600,351 | A | * | 7/1986  | Nelson .................. 119/846 |
| 4,669,423 | A |   | 6/1987  | van den Brink                 |
| 4,736,710 | A |   | 4/1988  | Nicolai                       |
| 4,766,850 | A | * | 8/1988  | O'Neill ................. 119/846 |
| 5,325,820 | A | * | 7/1994  | Briggs et al. ........... 119/846 |
| 5,361,727 | A |   | 11/1994 | Berry                         |
| 5,385,117 | A | * | 1/1995  | Hollis et al. ........... 119/846 |
| 5,469,815 | A |   | 11/1995 | Stross                        |
| 5,660,147 | A | * | 8/1997  | Wills et al. ............. 119/846 |
| 5,699,755 | A | * | 12/1997 | Wills et al. ............. 119/846 |
| 5,743,217 | A | * | 4/1998  | Jerome .................. 119/846 |
| 6,612,918 | B1 | * | 9/2003 | Livingston et al. ........ 452/53 |
| 6,623,232 | B1 | * | 9/2003 | Cattaruzzi ............... 414/398 |

* cited by examiner

Primary Examiner—Robert P. Swiatek
(74) Attorney, Agent, or Firm—Hinkle & O'Bradovich, LLC

(57) ABSTRACT

An apparatus and method for loading live poultry into cages for shipment to a processing station. The system comprises a trailer having an assembly and movement station to accept the deposit of live poultry. After deposit, the poultry moves by conveyor belt to a drop chute where the poultry is weighed in batches at a weighing station, and thence each weighed batch is in-turn deposited upon another conveyor at a conveying station to be moved to discrete cages at the cage loading station. The poultry is loaded by batches into individual cages arranged in stocked arrays. After each batch is loaded into cages thereby filling all cages of the stacked array, the cage array is automatically moved to a cage deployment station to be subsequently shipped to a processing plant.

9 Claims, 5 Drawing Sheets

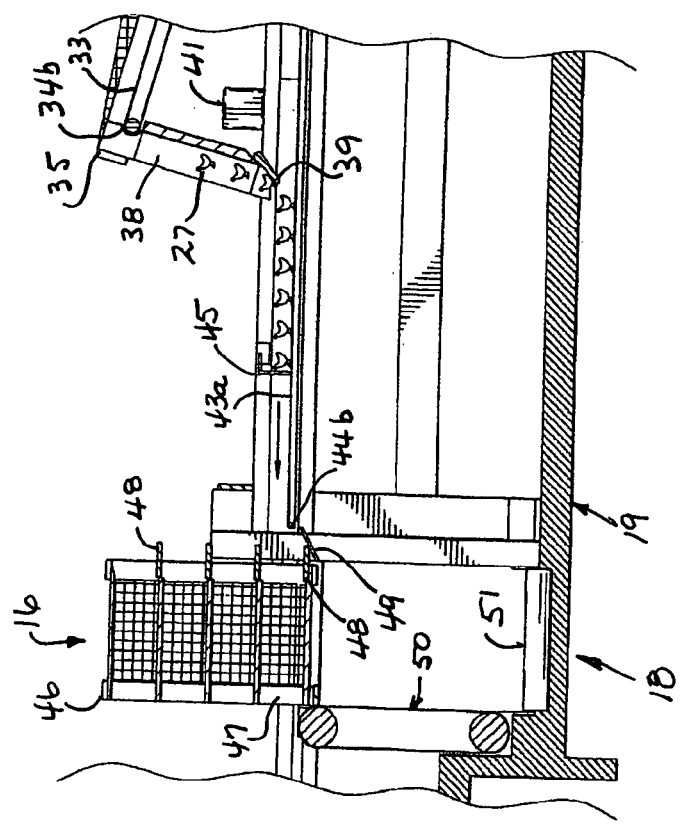
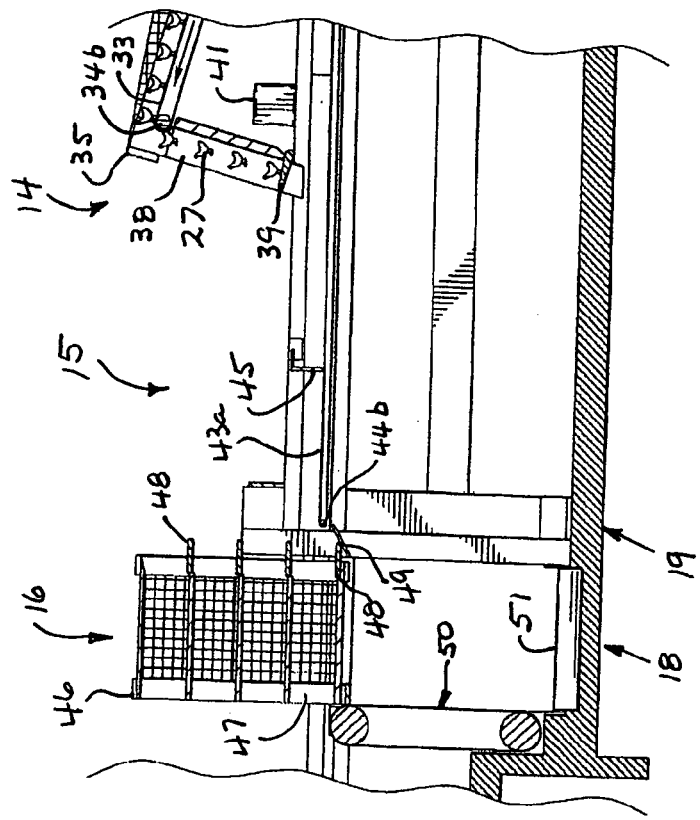

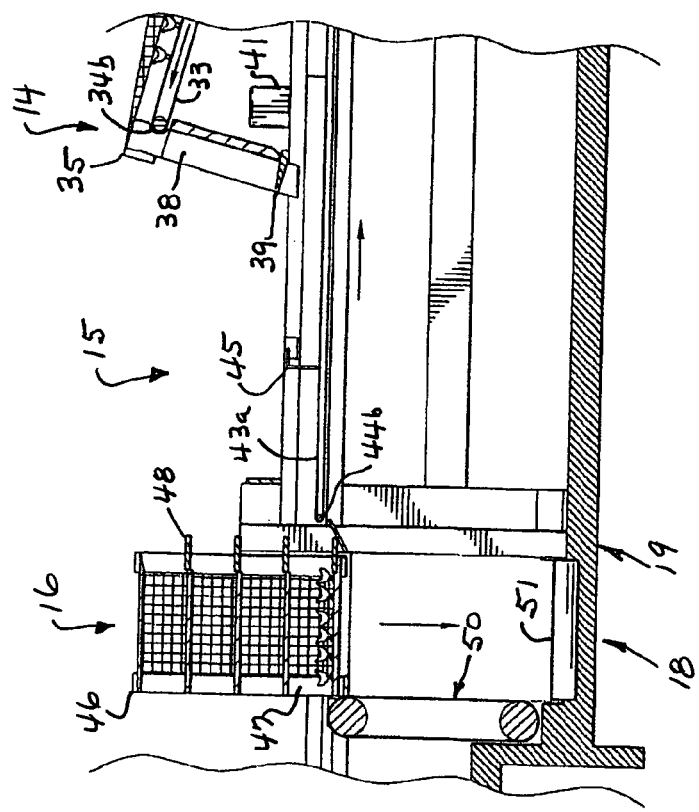
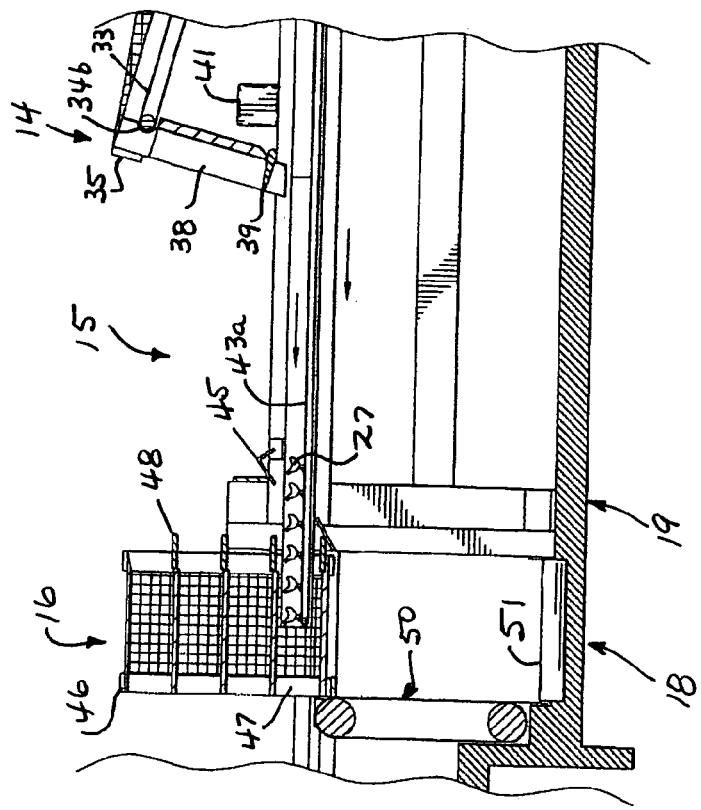

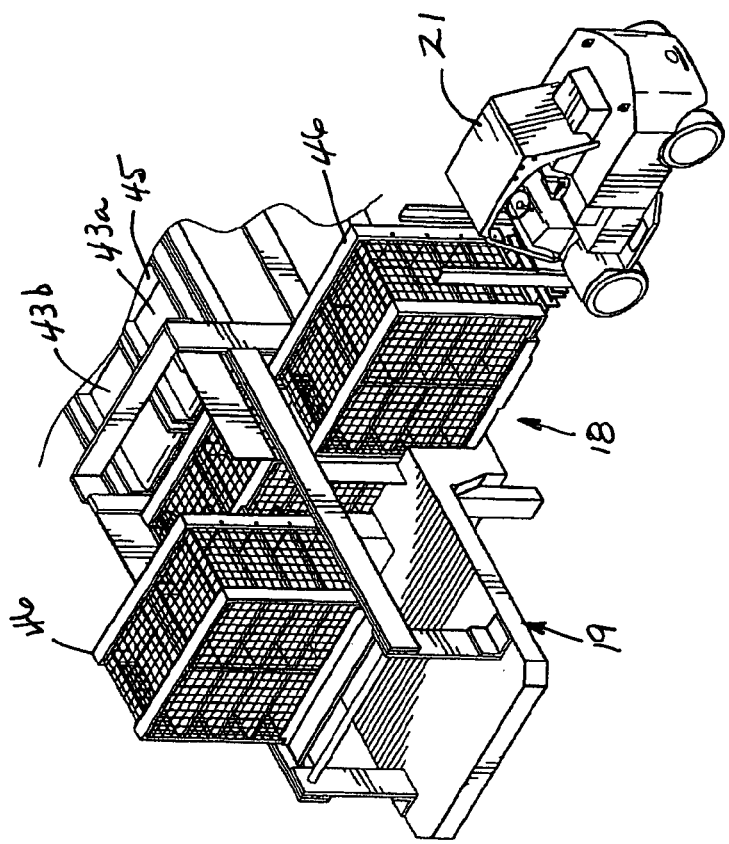
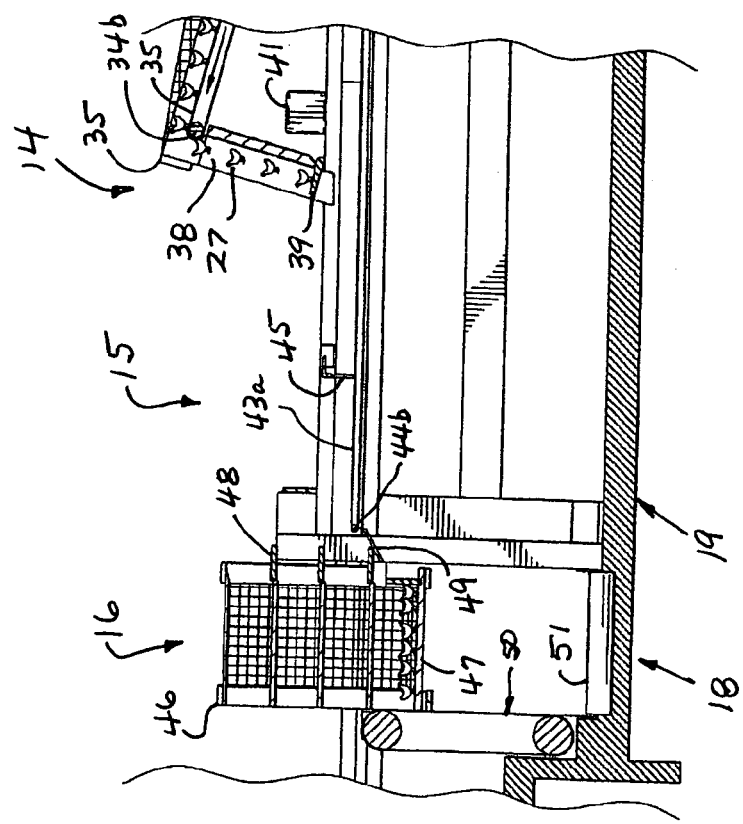

LIVE POULTRY LOADING SYSTEM

BACKGROUND OF THE INVENTION

I. Field of the Invention

The present invention relates to a method and apparatus for loading live poultry. The poultry (typically chickens) is gathered within a chicken house by a specialized caging system which picks the poultry up from the floor of the chicken house, and transports the poultry to a poultry loading system which conveys the poultry to a weighing station to weigh batches of poultry, and then transports each batch of poultry to a caging system wherein the poultry are loaded into cages and subsequently are then offloaded from the poultry loading system onto a conveyor for transporting the poultry to a processing plant.

II. Description of the Related Art

In the past there have been many poultry loading systems which attempt to automate the collection and loading of poultry for transporting the same to processing plants. However, the prior art suffers deficiencies in that the processing system does not fully automate the entire process.

A system which is indicative of the prior art is the patent to Stross (U.S. Pat. No. 5,469,815) which discloses a poultry loading system that moves poultry crates continuously along a trailer conveyor wherein the poultry is loaded during the movement of the crates.

U.S. Pat. No. 4,736,710 granted to Nicolai discloses a poultry loading system in which poultry is plucked from the ground surface by suction and then transported by conveyor belts to loading and transporting crates.

In U.S. Pat. No. 3,722,477 granted to Weldy et al., another poultry conveying and loading system is shown wherein the poultry is loaded into a chute which comprises a main conveyor system which delivers the poultry to a point adjacent to a cage system for holding the poultry for transport.

All of the prior art fail to show a coordinated processing system wherein the poultry is gathered, weighed, sorted and caged for shipment without human intervention.

SUMMARY OF THE INVENTION

In accordance with the present invention and the contemplated problems which have and continue to exist in this field, the objectives of this invention is to provide a poultry processing system which gathers the poultry, conveys the same to a weighing system, weighs the poultry and then conveys weighed batches of poultry to a cage loading station, and then loads the batches of poultry into cages and subsequently transports the cages to a deployment station for ultimate transportation to a processing plant.

The present invention includes a chicken loading system which collects poultry for caging prior to processing and which includes a special multi-tine pitchfork assembly which is attachable to a forklift-type truck which then gently picks up the poultry and moves the poultry to the poultry loading system trailer. The pitchfork assembly which has picked up the poultry will dump the poultry onto the assembly and movement station which comprises a series of conveyor belts which moves the poultry to a weighing station which will weigh the poultry in batches and then, at a predetermined weight, will dump the poultry onto a conveying station belt which moves the poultry to a cage loading station and subsequently loads each batch of weighed poultry into an individual cage. The cages are formed as cage sets wherein each cage set is an assembly of four pairs of cages, two cages on each level for a total of eight cages. When all eight cages are filled, the cage assembly will then slide out of the cage station onto a cage deployment station for a subsequent movement to the poultry processing plant.

The process then repeats after a new cage assembly is moved to the cage deployment station from the cage storage station.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 3 is partial elevation section view of the weighing station;

FIG. 4 is a partial elevation section view of the conveying station;

FIG. 5 is a partial elevation section view of the cage loading station;

FIG. 6 is a partial elevation section view of the cage loading station showing poultry having been loaded into one set of cages, and showing the cage unit being moved downwardly to access another cage section for subsequent loading;

FIG. 7 is a partial elevation section view showing the weighing station beginning a repeat second cycle of weighing; and FIG. 8 is a partial overall perspective view of the cage deployment station showing loaded cages being moved from the cage deployment station for transport to the processing plant.

DETAILED DESCRIPTION OF THE INVENTION

Figure 1:
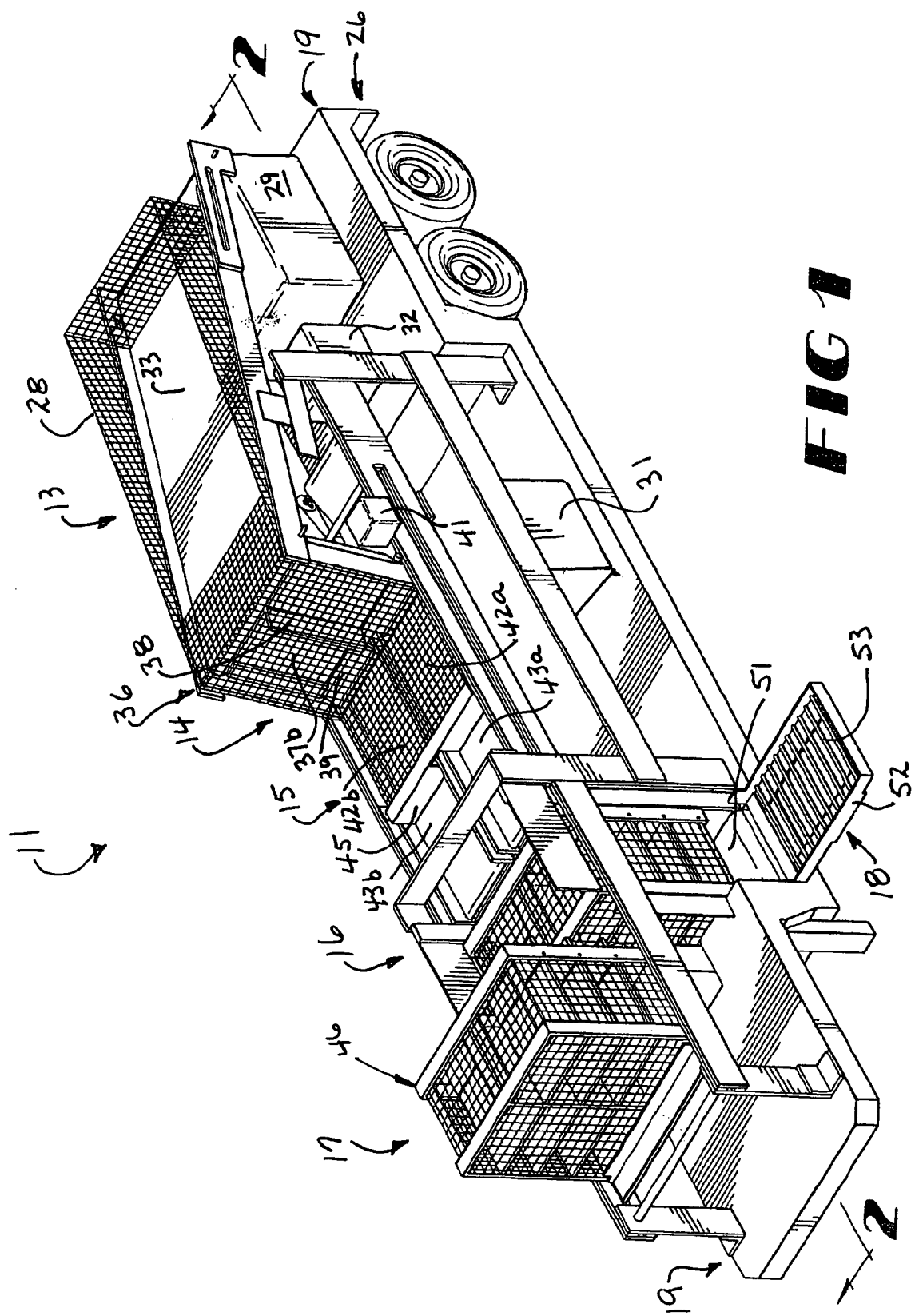
FIG. 1 is an overall perspective view of a trailer encompassing the poultry loading system.
Figure 2:
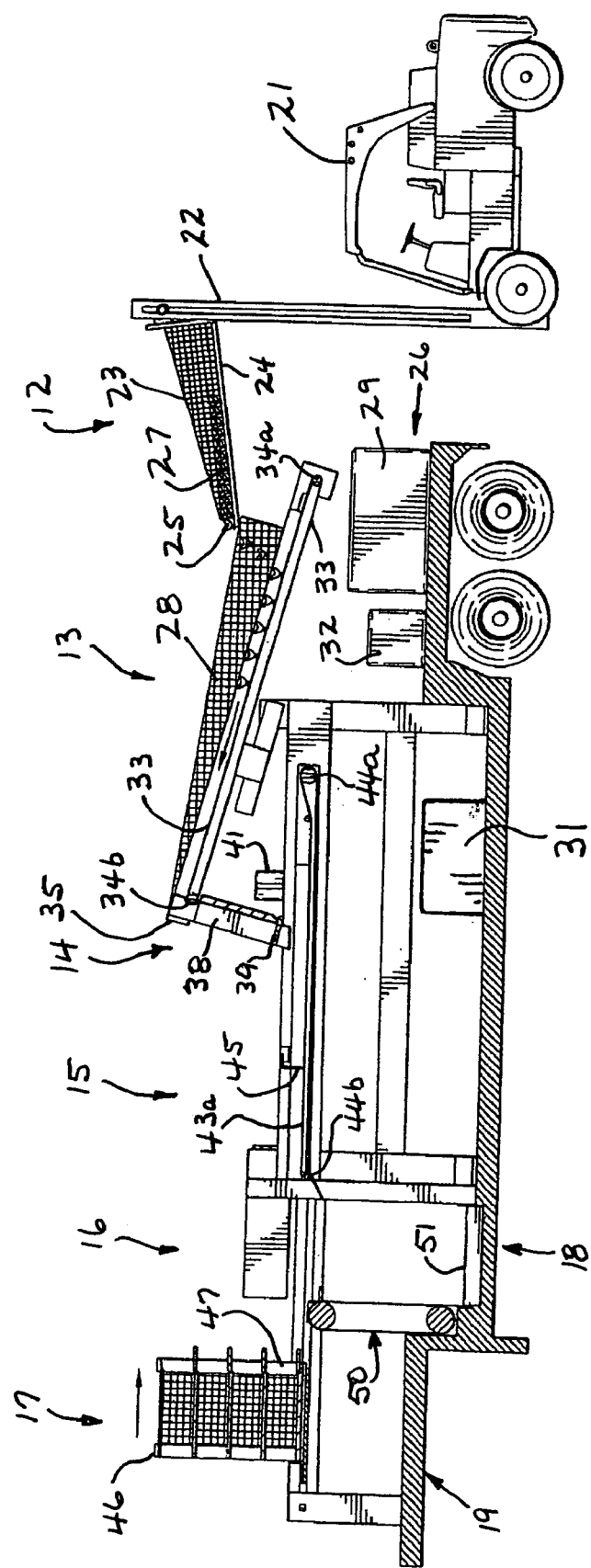
FIG. 2 is a side elevation view of the trailer of the poultry loading system and including the loading forklift tractor and pickup cage assembly.

Referring to the drawings wherein like reference numerals designate corresponding parts throughout the several figures, reference is made first to FIGS. 1 and 2. The poultry loading system 11 comprises several stations which are integral to the operation of the system. At the beginning of the system there is a deposit station 12 which leads to an assembly and movement station 13, thence to the weighing station 14, thence to the conveying station 15, thence to the cage loading station 16, thence to the cage storage station 17, and finally to the cage deployment station 18. The entire system is mounted upon a trailer 19 for ease of movement from one loading area to another.

In the poultry business, poultry is typically raised and kept in houses and, in order to gather the poultry for shipment, it is necessary to contain and pickup the poultry by some manner for ease of shipment. As might be expected, the poultry is not suitably retrieved by hand because of the extreme amount of actual handling involved. It is much easier to pickup the poultry by mechanical means in large numbers. Typically, poultry houses are long, narrow affairs and mechanical means may be suitably introduced for gathering the poultry in large lots. To this end, the present invention contemplates a loading tractor 21 which has a lift boom 22 equipped with a pickup cage 23 which is reciprocally mounted on the lift boom to accomplish the process of picking up the poultry from the floor of the poultry house. In actual operation, the loading tractor would be driven into the poultry house (not shown) with the lift boom generally parallel to the ground and with the pickup cage 23 also generally parallel to the ground so that the bottom 24 of the pickup cage would generally rest on the ground surface. The driver of the loading tractor would then gently move the loading tractor toward the poultry in the poultry house, thereby slipping the forward edge 25 of the pickup cage under the poultry and moving the poultry into the pickup cage by the forward movement of the loading tractor 21. Once a sufficient number of poultry are gathered in the pickup cage, the loading tractor would retract from the poultry house and move to the proximal end 26 of the trailer 19. At this point, the lift boom 22 would be in the generally vertical position as shown in FIG. 2 with the pickup cage 23 near the top of the boom with the poultry 27 confined within the pickup cage. At this point, the driver of the loading tractor 21 would position the pickup cage 23 adjacent to and above the assembly and movement station 13 preparatory to depositing the poultry into the assembly and movement station 13.

At this point, the driver of the loading tractor 21 would tilt the lift boom 22 forwardly at such an angle to position the pickup cage 23 over the assembly cage 28, and will move the lift boom and the pickup cage in such a fashion as to dump the poultry into the assembly cage 23 at the assembly and movement station.

At this point, an operator will have already energized the power unit 29 which typically will be a diesel election generator, but, of course, could be any suitable power unit designed for the particular system. The power unit will energize the drive motor 31, or a series of drive motors as the case may be, which, in turn, will energize the various operative systems on the trailer 19 needful and necessary to convey the poultry from one station to another, and to cage the poultry, and to move the caged poultry to the cage deployment station 18. A control system mounted in the control housing 32 will be designed to effect all necessary controls for the entire poultry loading system. It is anticipated that the system may be manually controlled or may be fully automated as the needs may arise.

Returning now to the assembly and movement station 13 after the poultry have been deposited in the assembly cage 28, it should be noted that the platform of the assembly and movement station 13 is a continuous conveyor drive belt 33, the drive belt 33 is mounted around opposed pulleys 34a and 34b (see FIG. 2) which have integral drive motors to effect the movement of the conveyor drive belt at desired times by means of the control mechanism within the control housing 32. As the poultry is dumped upon drive belt 33, it is moved forwardly toward the distal edge 35 of the assembly and movement station 13 to the weighing station 14.

The weighing station 14 is an enclosed caged area 36 which may be divided into two compartments 37a and 37b for ease of handling the poultry. The two compartments are separated by a fixed member 38.

As the poultry is moved into the enclosed cage 36 of the weighing station, they fall to a weighing platform 39 at the bottom of the cage. The platform 39 extends the full transverse length of the cage. As the poultry stacks on the weighing platform 39 (as seen in FIG. 3), the total weight of the poultry is determined by the weight sensing flap control mechanism 41 which will sense the total weight upon the platform either as a total weight in the entire cage or in the alternative as total weight in each of the two caged compartments 37a and 37b. Once the desired preset weight has been measured, the flap control mechanism 41 will then activate the weighing platform 39 and cause the platform to reciprocate downwardly to discharge the weighed poultry onto the conveying station 15. In this way, an exact amount of poultry weight will be batch loaded into the subsequent cage units each and every time the weighing cycle takes place.

Once the poultry has been released from the weighing station, the poultry then falls into a pair of holding cages 42a and 42b which lie atop dual cage feeder conveyor belts 43a and 43b. It should be noted that the specific example of dual conveyor belts is for illustrative purposes only, as the conveyor systems described herein can be single belts or multiple belts as needed. As the poultry is released by the weighing platform 39, the poultry then migrates into the holding cages 42a and 42b atop the dual conveyor belts and, at that time, the dual conveyor belts begin to move upon pulleys 44a and 44b, and the movement brings the batch of poultry fully into the holding cages and the holding cages 42a and 42b, then begin to reciprocate through the conveying station 15 toward the cage loading station 16. The poultry is maintained in the holding cages by means of a detention bar 45 which closes the distal end of the cages, thereby maintaining the poultry within the cages. As the holding cages move toward the cage loading station 16, as seen in FIG. 4, the detention bar moves to its operative limit near the edge of the dual conveyor belts 43a and 43b at which time the holding cages 42a and 42b cease movement. However, the dual conveyor belts are continuing to move and the detention bar automatically raises, as seen in FIG. 5, to allow the dual conveyor belts to move the poultry to the multilevel cage unit 46 at the cage loading station 16. As seen in FIG. 5, the holding cages 42a and 42b have ceased movement and the detention bar 45 has been raised, and the dual conveyor belts continue to move the poultry toward the cage unit. In addition, the entire unit comprising the dual conveyor belts 43a and 43b also reciprocate to the cage unit and project therein a suitable distance so that the poultry moving along the dual conveyor belts 43a and 43b are positioned within a first level 47 of the cage unit. As previously noted, each cage, unit will have multiple levels, in the case shown in the drawings there are four levels, and once each level has been fully loaded with the batch of poultry then the conveyor belts 43a and 43b reciprocate out of the cage unit as shown in FIG. 6, thereby triggering an indexing mechanism 50 allowing the entire cage unit 46 to drop downwardly one complete level to position the next higher level even with the dual conveyor belt mechanism. As the cage section is dropping downwardly as shown in FIG. 6, the cage doors 48 of the cages of the first level 47 just loaded will be reciprocated upwardly by the closure member 49 which shuts the cage doors 48 which are automatically locked closed as the cage is descending.

The procedure of loading the individual cage levels continue until each level of the cage unit have been fully loaded, at which time the entire cage unit 46 then rests on the lower platform 51. At this time, the entire cage unit is then automatically moved to the cage discharge platform 52 which comprises rollers 53 to ease the movement from the platform. At this point, a suitable forklift truck, such as shown in FIG. 2, would then move the loaded cage unit 46, to a suitable transportation trailer for shipment to the poultry processing plant. After a cage unit 46 is fully placed upon the cage discharge platform 51, a subsequent cage unit 46 is automatically indexed and moves from the cage storage station 17 to the cage loading station 16 and takes its most upright position ready for the lower individual cages of the lower level 47 to be batch loaded as previously described. As can be seen from the drawings, and especially in FIG. 7, once an individual pair of cages have been batch loaded, the weighing and conveying process of moving a batch of poultry to the cages is repeated.

In addition, the specific apparatus just described, the present system contemplates a method of processing poultry utilizing the described apparatus which is entirely novel in its approach. The method generally comprises the steps of:

providing a trailer mounted conveyor loading system having a deposit station, an assembly and movement station, a weighing station, a conveying station, a cage loading station, a cage storage station and a cage deployment station, providing the loading system a power unit and a control system, gathering live poultry by mechanical means into the deposit station, loading live poultry from the deposit station onto the assembly and movement station, conveying the live poultry from the assembly and movement station to the weighing station, weighing the live poultry by the batch at the weighing station until a predetermined batch weight is achieved, sensing the predetermined weight of the batch and automatically depositing the batch onto the conveying station, conveying the batch of live poultry through the conveying station to the cage loading station, and providing a cage at the cage loading station to accept the batch of live poultry, conveying the batch of live poultry into the cage, moving the loaded cage from the cage loading station to the cage deployment station for off loading to a conveyance means, moving a subsequent cage from the cage storage station to the cage loading station.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A method of loading live poultry into cages, comprising the steps of:

providing a trailer mounted conveyor loading system having a deposit station, an assembly and movement station, a weighing station, a conveying station, a cage loading station, a cage storage station and a cage deployment station;

providing the loading system with a power unit and a control system;

providing live poultry to the deposit station;

loading live poultry from the deposit station onto the assembly and movement station;

conveying the live poultry from the assembly and movement station to the weighing station, weighing the live poultry by the batch at the weighing station until a predetermined batch weight is achieved, sensing the predetermined weight of the batch and automatically depositing the batch onto the conveying station;

conveying the batch of live poultry through the conveying station to the cage loading station; and providing a multi-leveled cage at the cage loading station to accept the batch of live poultry, conveying the batch of live poultry into the cage, moving the loaded cage downwardly in multiple vertical increments until the multiple levels of the cage are full from the cage loading station to the cage deployment station for off loading to a conveyance means, moving a subsequent cage from the cage storage station to the cage loading station.

2. The method of loading live poultry into cages as claimed in claim 1 further comprising providing the assembly and movement station with a conveyor belt powered by the power unit and controlled by the control system.

3. The method of loading live poultry into cages as claimed in claim 1 further comprising providing the weighing station with at least one compartment for receiving the poultry.

4. The method of loading live poultry into cages as claimed in claim 3 further comprising providing a weighing platform juxtaposed with the at least one compartment for receiving the batch of poultry, wherein said weighing platform communicates with a weight sensing flap control mechanism to control the weighing platform and causing the weighing platform to deposit the batch of poultry onto the conveying station.

5. The method of loading live poultry into cages as claimed in claim 1 further comprising:

providing the conveying station with at least one cage for receiving the deposited poultry from the assembly and movement station; and providing the conveying station with at least one conveyor belt to move the deposited poultry through the conveying station.

6. The method of loading live poultry into cages as claimed in claim 5 further comprising providing the at least one cage with a detention bar effecting closure of one end of the at least one cage.

7. The method of loading live poultry into cages as claimed in claim 6 further comprising controlling the detention bar to lift, at desired times, to release the conveyed poultry to the cage loading station.

8. The method of loading live poultry into cages as claimed in claim 7 further comprising moving the at least one conveyor belt into the at least one loading cage a predetermined distance, depositing the poultry into the loading cage, reciprocating the conveyor belt from the loading cage, closing the loading cage, moving the loading cage to the cage deployment station.

9. The method of loading live poultry into cages, comprising the steps of:

providing a trailer mounted conveyor loading system having a deposit station, an assembly and movement station, a weighing station, a conveying station, a cage loading station, a cage storage station and a cage deployment station;

providing the loading system a power unit and a control system;

providing live poultry to the deposit station;

loading live poultry from the deposit station onto the assembly and movement station, and providing the assembly and movement station with a conveyor belt powered by the power unit and controlled by the control system;

conveying the live poultry from the assembly and movement station to the weighing station, weighing the live poultry by the batch at the weighing station until a predetermined batch weight is achieved, sensing the predetermined weight of the batch and automatically depositing the batch onto the conveying station;

providing the conveying station with at least one cage for receiving the deposited poultry from the assembly and movement station, providing the conveying station with at least one conveyor belt to move the deposited poultry through the conveying station;

providing the at least one cage with a detention bar effecting closure of one end of the at least one cage;

controlling the detention bar to lift, at desired times, to release the conveyed poultry to the cage loading station; and providing a multi-leveled cage at the cage loading station to accept the batch of live poultry, moving the at least one conveyor belt into the at least one loading cage a predetermined distance, depositing the poultry into the loading cage in downward vertical increments, reciprocating the conveyor belt from the loading cage, closing the loading cage, moving the loading cage downwardly to the cage deployment station for off-loading to a conveyance means, moving a subsequent cage from the cage storage station to the cage loading station.

* * * * *